(12) United States Patent  (10) Patent No.: US 8,925,995 B2
Marcus et al.  (45) Date of Patent: Jan. 6, 2015

(54) ROTATABLE SIDE WINDOW VISOR AND GLARE SHIELD

(71) Applicants: Jonathan P. Marcus, Holland, MI (US); Brian R. Dexter, Grand Haven, MI (US)

(72) Inventors: Jonathan P. Marcus, Holland, MI (US); Brian R. Dexter, Grand Haven, MI (US)

(73) Assignee: Marcus Automotive, LLC, Holland, MI (US)

( * ) Notice: Subject to any disclaimer, the term of this patent is extended or adjusted under 35 U.S.C. 154(b) by 0 days.

(21) Appl. No.: 13/633,309

(22) Filed: Oct. 2, 2012

(65) Prior Publication Data

US 2013/0082479 A1  Apr. 4, 2013

Related U.S. Application Data

(60) Provisional application No. 61/542,388, filed on Oct. 3, 2011.

(51) Int. Cl.
*B60J 3/02* (2006.01)

(52) U.S. Cl.
CPC .................................... *B60J 3/0208* (2013.01)
USPC ....................................................... 296/97.8

(58) Field of Classification Search
USPC ........ 296/97.3, 97.8, 97.9, 97.6, 97.13, 97.12
See application file for complete search history.

(56) References Cited

U.S. PATENT DOCUMENTS

| | | | |
|---|---|---|---|
| 1,898,276 A | 2/1933 | Van Dresser | |
| 1,942,663 A | 1/1934 | Saunders | |
| 2,034,849 A | 3/1936 | Westrope | |
| 2,101,901 A | 9/1936 | Fletcher | |
| 2,226,056 A | 12/1940 | Fletcher | |
| 2,228,209 A | 1/1941 | Harrington | |
| 2,422,863 A | 6/1947 | Stroth | |
| 2,424,500 A | 7/1947 | Peltier et al. | |
| 2,454,613 A | 11/1948 | Peltier et al. | |
| 2,496,129 A | 1/1950 | Moore | |
| 2,498,966 A | 2/1950 | Sauer | |
| 2,517,872 A | 8/1950 | Hamel | |
| 2,634,161 A | 4/1953 | Beets | |
| 2,685,336 A | 8/1954 | Menighan | |
| 2,965,193 A | 11/1954 | Hamel | |
| 2,733,763 A | 2/1956 | Nygaard | |
| 2,823,950 A | 2/1958 | Harris | |
| 2,912,275 A | 11/1959 | O'Neal | |
| 2,965,415 A | 12/1960 | Dryden | |
| 3,159,421 A | 12/1964 | Samuelson | |
| 3,191,986 A | 6/1965 | Simon | |
| 3,343,867 A | 9/1967 | Couch et al. | |
| 3,375,364 A | 3/1968 | Marcus | |

(Continued)

FOREIGN PATENT DOCUMENTS

| JP | 59029511 | 2/1984 |
|---|---|---|
| JP | 2004 42702 | 2/2004 |

(Continued)

*Primary Examiner* — Pinel Romain
(74) *Attorney, Agent, or Firm* — Price Heneveld LLP

(57) ABSTRACT

A side window visor is mounted to a header to pivot downwardly away from the windshield. The visor is secured to the vehicle with a two axis angled mounting assembly which allows the side window visor to pivot downwardly away from the headliner and then upwardly and to the side for blocking sun entering from the side window without encroaching in the user's head space. A visor assembly including the side window visor also has a primary visor which is mounted to pivot downwardly away from the windshield and a rotatable glare shield.

20 Claims, 19 Drawing Sheets

(56) References Cited

U.S. PATENT DOCUMENTS

| | | |
|---|---|---|
| 3,767,256 A | 10/1973 | Sarkees |
| 3,834,755 A | 9/1974 | Dexter |
| 3,926,470 A | 12/1975 | Marcus |
| 3,961,820 A | 6/1976 | Spangler |
| 4,023,856 A | 5/1977 | DeRees |
| 4,195,876 A | 4/1980 | Timperio |
| 4,205,873 A | 6/1980 | Viertel et al. |
| 4,248,473 A | 2/1981 | Hildenbrand |
| 4,264,100 A | 4/1981 | Keeler, II |
| 4,435,009 A | 3/1984 | Foggini |
| 4,468,062 A | 8/1984 | Marcus et al. |
| 4,486,819 A | 12/1984 | Marcus et al. |
| 4,580,829 A | 4/1986 | Matheopoulos |
| 4,614,375 A | 9/1986 | Miller et al. |
| 4,623,188 A | 11/1986 | Juraschek et al. |
| 4,655,498 A | 4/1987 | Panzner et al. |
| 4,728,142 A | 3/1988 | Gavagan |
| 4,736,979 A | 4/1988 | Harvey |
| 4,807,093 A | 2/1989 | Cisler |
| 4,828,314 A | 5/1989 | Gavagan |
| 4,844,530 A | 7/1989 | Mahler et al. |
| 4,950,021 A | 8/1990 | Vandagriff |
| 4,978,160 A | 12/1990 | Welschoff |
| 4,982,992 A | 1/1991 | Vu et al. |
| 4,986,592 A | 1/1991 | Kaiser et al. |
| 4,989,910 A | 2/1991 | Mersman et al. |
| 4,998,765 A | 3/1991 | Van Order et al. |
| 5,016,938 A | 5/1991 | Tschan |
| 5,026,108 A | 6/1991 | Leahy |
| 5,067,764 A | 11/1991 | Lanser et al. |
| 5,104,174 A | 4/1992 | Gute |
| 5,152,573 A | 10/1992 | Riera |
| 5,156,434 A | 10/1992 | Vandagriff |
| 5,197,777 A | 3/1993 | Lanser et al. |
| 5,219,199 A | 6/1993 | Smith et al. |
| 5,271,653 A | 12/1993 | Shirley |
| 5,283,683 A * | 2/1994 | Yamamoto .................. 359/229 |
| 5,301,856 A | 4/1994 | Newsome |
| 5,306,065 A | 4/1994 | Ades |
| 5,421,632 A * | 6/1995 | Adomeit et al. ............. 296/97.9 |
| 5,445,427 A | 8/1995 | Vandagriff |
| 5,466,029 A | 11/1995 | Zetterlund |
| 5,470,123 A | 11/1995 | Snyder |
| 5,478,131 A | 12/1995 | Marks |
| 5,490,708 A | 2/1996 | Lee |
| 5,513,892 A | 5/1996 | Thomas |
| 5,577,792 A | 11/1996 | Muyres et al. |
| 5,580,117 A | 12/1996 | Goclowski |
| 5,611,591 A | 3/1997 | Van Devender |
| 5,613,725 A | 3/1997 | Lozano |
| 5,662,371 A | 9/1997 | Gera et al. |
| 5,711,570 A | 1/1998 | Wu et al. |
| 5,765,898 A | 6/1998 | Crotty, III |
| 5,842,748 A * | 12/1998 | Cummins ................... 296/97.2 |
| 5,873,621 A * | 2/1999 | Kuighadush et al. ........ 296/97.8 |
| 5,902,002 A * | 5/1999 | Wilson ....................... 296/97.13 |
| 6,024,399 A | 2/2000 | Viertel et al. |
| 6,059,347 A | 5/2000 | Davalos |
| 6,131,987 A | 10/2000 | Rossiter |
| 6,189,947 B1 | 2/2001 | Annan |
| 6,220,644 B1 | 4/2001 | Tiesler et al. |
| 6,231,105 B1 | 5/2001 | Viertel |
| 6,290,280 B1 | 9/2001 | Riekse |
| 6,371,546 B1 | 4/2002 | Jefferson |
| 6,409,246 B1 | 6/2002 | Rennie |
| 6,412,850 B1 | 7/2002 | Francis et al. |
| 6,450,560 B1 | 9/2002 | Sturt et al. |
| 6,488,328 B2 | 12/2002 | Quapil |
| 6,543,832 B1 | 4/2003 | Bogdanski et al. |
| 6,547,308 B2 | 4/2003 | Hamelink et al. |
| 6,565,140 B2 * | 5/2003 | Wells ........................... 296/97.2 |
| 6,612,637 B1 | 9/2003 | Crotty, III |
| 6,666,493 B1 | 12/2003 | Naik |
| 6,776,446 B1 | 8/2004 | Tutt |
| 6,890,017 B2 * | 5/2005 | Herbst et al. ................. 296/97.1 |
| 6,899,371 B1 * | 5/2005 | Hammond ................... 296/97.6 |
| 6,908,136 B2 | 6/2005 | Bohm et al. |
| 7,011,354 B1 * | 3/2006 | Gullickson ................. 296/97.11 |
| 7,077,454 B1 * | 7/2006 | Schambre .................... 296/97.8 |
| 7,090,378 B1 | 8/2006 | Zadro |
| 7,111,890 B2 | 9/2006 | Delus et al. |
| 7,219,947 B2 | 5/2007 | Takabatake |
| 7,320,493 B2 | 1/2008 | Kumakawa et al. |
| 7,344,176 B2 | 3/2008 | Maharaj |
| 7,556,308 B2 | 7/2009 | Lee et al. |
| 7,954,875 B2 | 6/2011 | Bohner et al. |
| 8,038,199 B2 | 10/2011 | Marcus et al. |
| 2006/0125277 A1 * | 6/2006 | Maharaj ...................... 296/97.8 |
| 2007/0063528 A1 | 3/2007 | Ogawa |
| 2010/0090494 A1 * | 4/2010 | Marcus et al. ............... 296/97.5 |
| 2011/0109117 A1 | 5/2011 | Marcus et al. |

FOREIGN PATENT DOCUMENTS

| | | |
|---|---|---|
| JP | 3114361 | 8/2005 |
| KR | 20010055599 | 7/2001 |
| KR | 100324383 | 2/2002 |
| KR | 10-2007-0047080 | 5/2007 |
| KR | 1020070047080 | 5/2007 |
| KR | 1020080017328 | 2/2008 |
| WO | WO8500028 | 1/1985 |
| WO | WO 94/08812 | 4/1994 |
| WO | WO9408812 | 4/1994 |
| WO | WO 2011/133791 | 10/2011 |
| WO | PCT/US2011/033462 | 1/2012 |

\* cited by examiner

ROTATABLE SIDE WINDOW VISOR AND GLARE SHIELD

CROSS-REFERENCE TO RELATED APPLICATIONS

This application claims priority under 35 U.S.C. §119(e) and the benefit of U.S. Provisional Application No. 61/542,388 entitled ROTATABLE AUXILIARY VISOR AND GLARE SHIELD, filed on Oct. 3, 2011, by Jonathan P. Marcus, et al., the entire disclosure of which is incorporated herein by reference.

BACKGROUND OF THE INVENTION

The present invention relates to vehicle visors and particularly to a visor assembly and mounting structure for attaching the visor assembly to a vehicle.

Typically visors are mounted to a vehicle with a pivot hinge arrangement coupled to the vehicle roof near or at the A-pillar of the vehicle. When used, such visors are pivoted downwardly in a direction toward the windshield passing momentarily through the forward line of sight of the occupant as it is moved to a sun-blocking position. Also, conventional visor mounts frequently employ an auxiliary releasing clip at an end opposite the pivot connection to allow the visor to be released from the front windshield position and pivoted to a side window position. When so manipulating a visor, it sometimes becomes necessary for the occupant to duck his/her head to allow the visor to pass through the head area of the vehicle interior.

With such conventional mounting systems for vehicle visors, at least two safety issues are presented. First, the operator is momentarily distracted while manipulating the visor for use either in the front windshield position, since it passes through the line of sight, and again when it is pivoted to a side window position. Secondly, when pivoted downwardly, the visor may in some adjusted positions present an edge which projects toward the user's head. In the event of an accident, this could cause serious injury despite requirements that the edges of the visor have curved edges.

Newer vehicle designs have become more aerodynamic, partly to conserve fuel. In such designs, the windshield is more sloped and extends rearwardly into the interior of the vehicle. Conventional visor mounting systems place the visors further rearwardly even closer to the occupant's head, which makes it even more difficult to manipulate the visor without distracting, particularly, the vehicle operator. Some visor systems include an auxiliary visor which can be moved independently of the main windshield visor to a side window position. Movement of such auxiliary visors likewise is through the driver's head zone and can cause a significant distraction while operating a motor vehicle.

There exists a need, therefore, for a visor system which can be mounted to a vehicle in a manner which provides excellent sun-blocking properties, is easy to maneuver, eliminates some of the safety issues, and still provides features to which consumers have become accustomed, such as illuminated vanity mirrors, interior lighting, extendable sun-blocking or filtering panels, and side window sun-blocking protection.

SUMMARY OF THE INVENTION

According to one embodiment of the invention, a side window visor for a vehicle is mounted to a header and is secured to the vehicle with a two axis angled mounting assembly which allows the side window visor to pivot downwardly away from the windshield and then upwardly and to the side for blocking sun entering from the side window without encroaching in the user's head space. In one preferred embodiment of the invention, the visor assembly also includes a primary visor which is mounted to pivot downwardly away from the windshield. In another preferred embodiment of the invention, the primary visor includes a rotatable sun-blocking or screening glare shield. In yet another preferred embodiment of the invention, the side window visor includes a covered vanity mirror. In still a further embodiment, a passenger side visor is provided which has the same mounting structure as the driver's side window visor and serves as a front and side window visor.

Thus, with the visor system of the present invention, a unique mounting arrangement is provided in which the visors are mounted to pivot downwardly away from the windshield from a stored position within a pocket formed in a vehicle headliner. The visor system also provides an improved side window visor which can be moved to the side without encroaching in the user's space. The visor system can include additional features, such as a vanity mirror, extendable sun-blocking or filtering panels, interior illumination, and a garage door opening transmitter.

These and other features, objects and advantages of the present invention will become apparent upon reading the following description thereof together with reference to the accompanying drawings.

DETAILED DESCRIPTION OF THE PREFERRED EMBODIMENT

Figure 1:
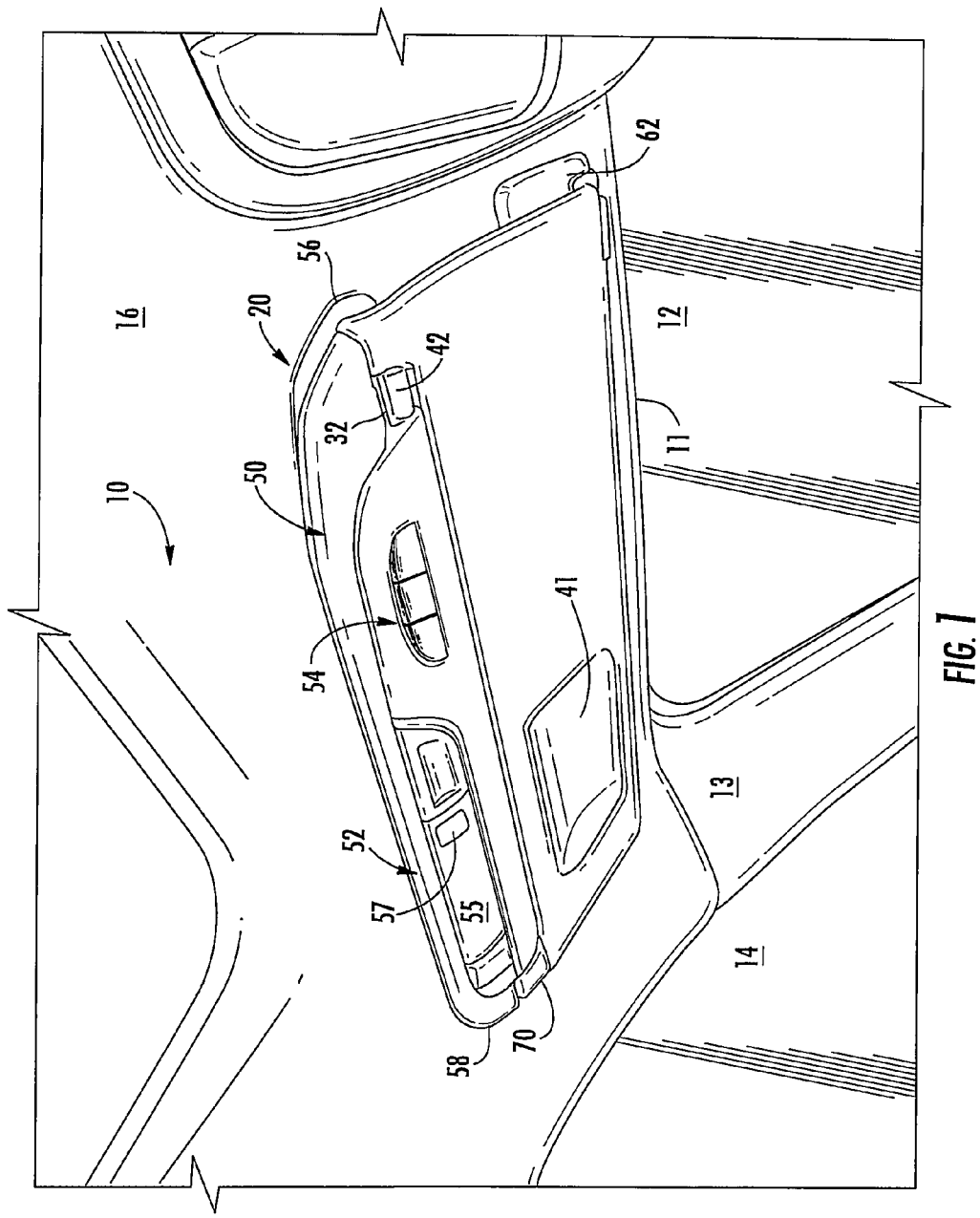
FIG. 1 is a perspective view of a driver's side visor incorporating the present invention, shown installed in a vehicle and in a stored position.
Figure 2:
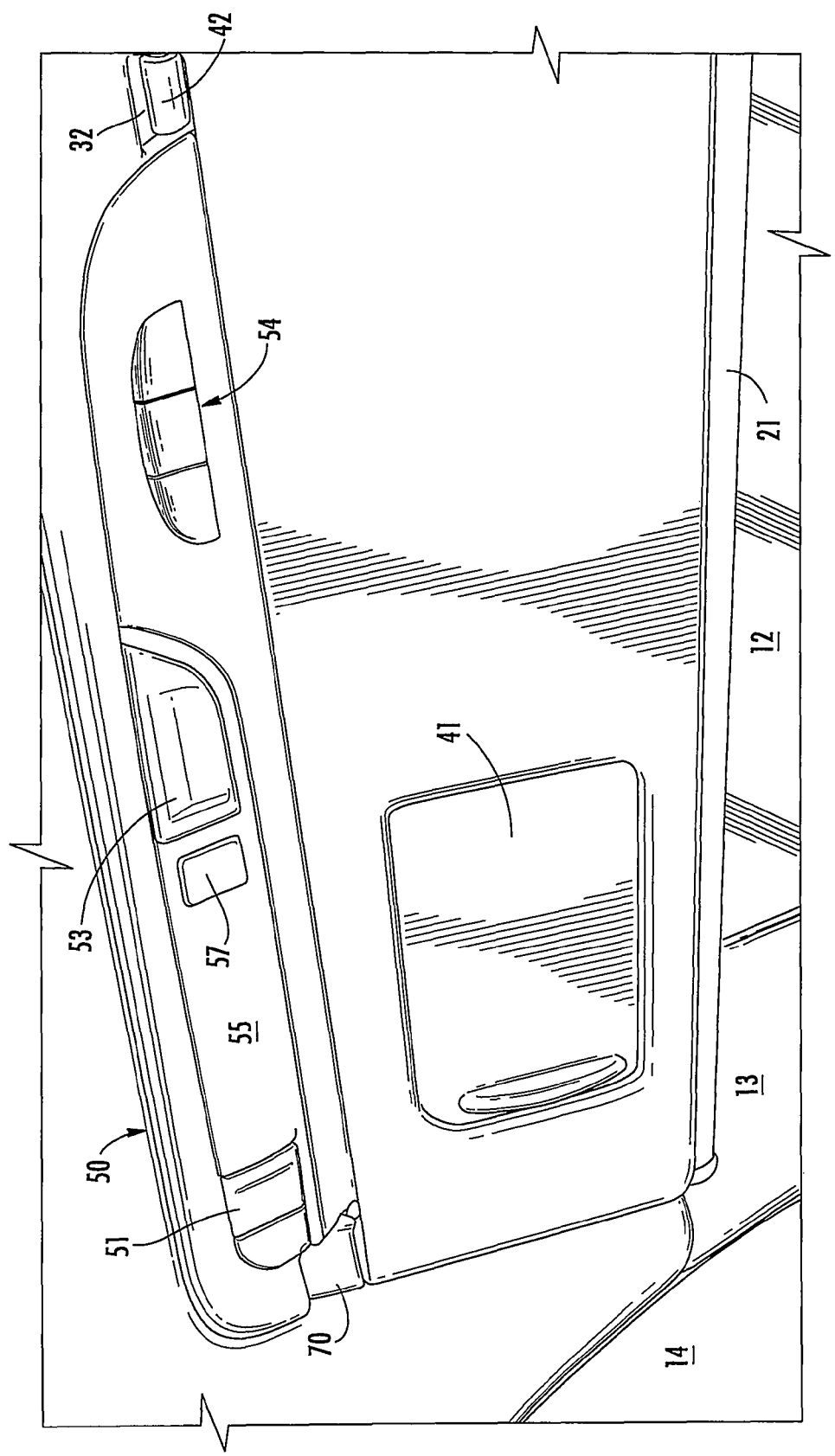
FIG. 2 is a perspective view of the visor assembly shown in a first operational position.
Figure 3:
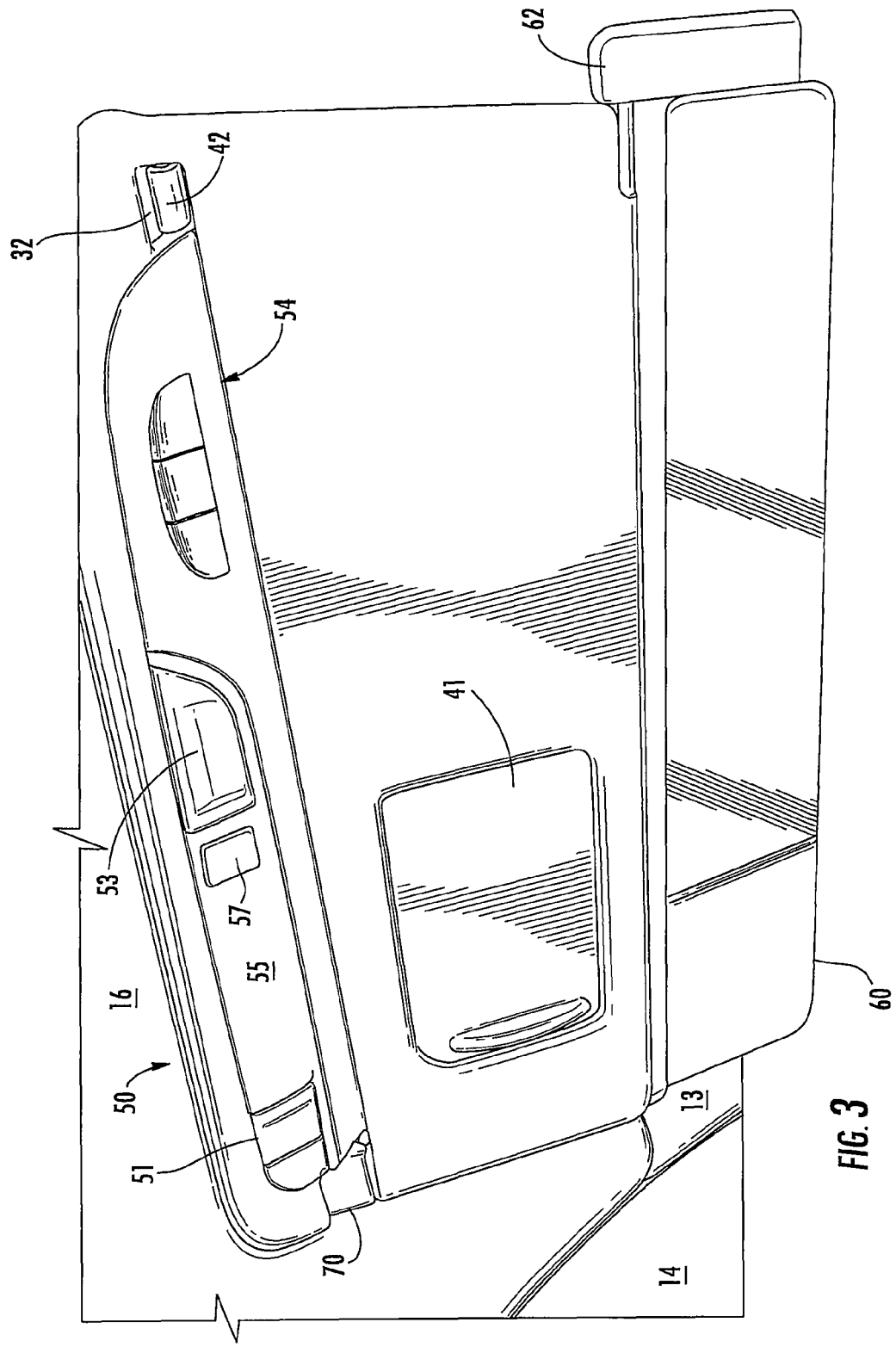
FIG. 3 is a perspective view of the visor assembly shown in FIG. 2 with the glare shield deployed.
Figure 4:
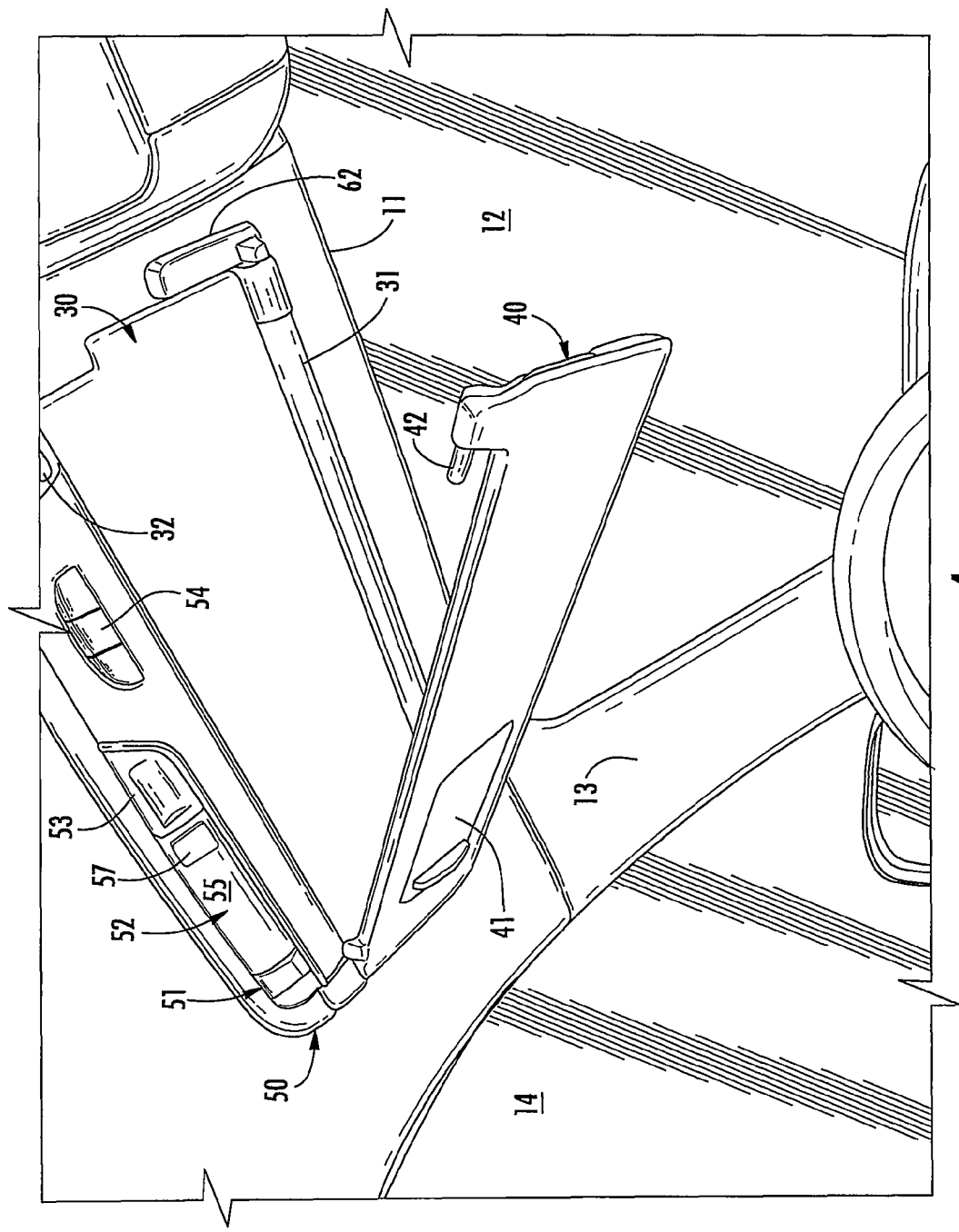
FIG. 4 is a perspective view of the visor shown in FIG. 1, shown with the side window visor being moved from the stored position toward a side window.
Figure 9:
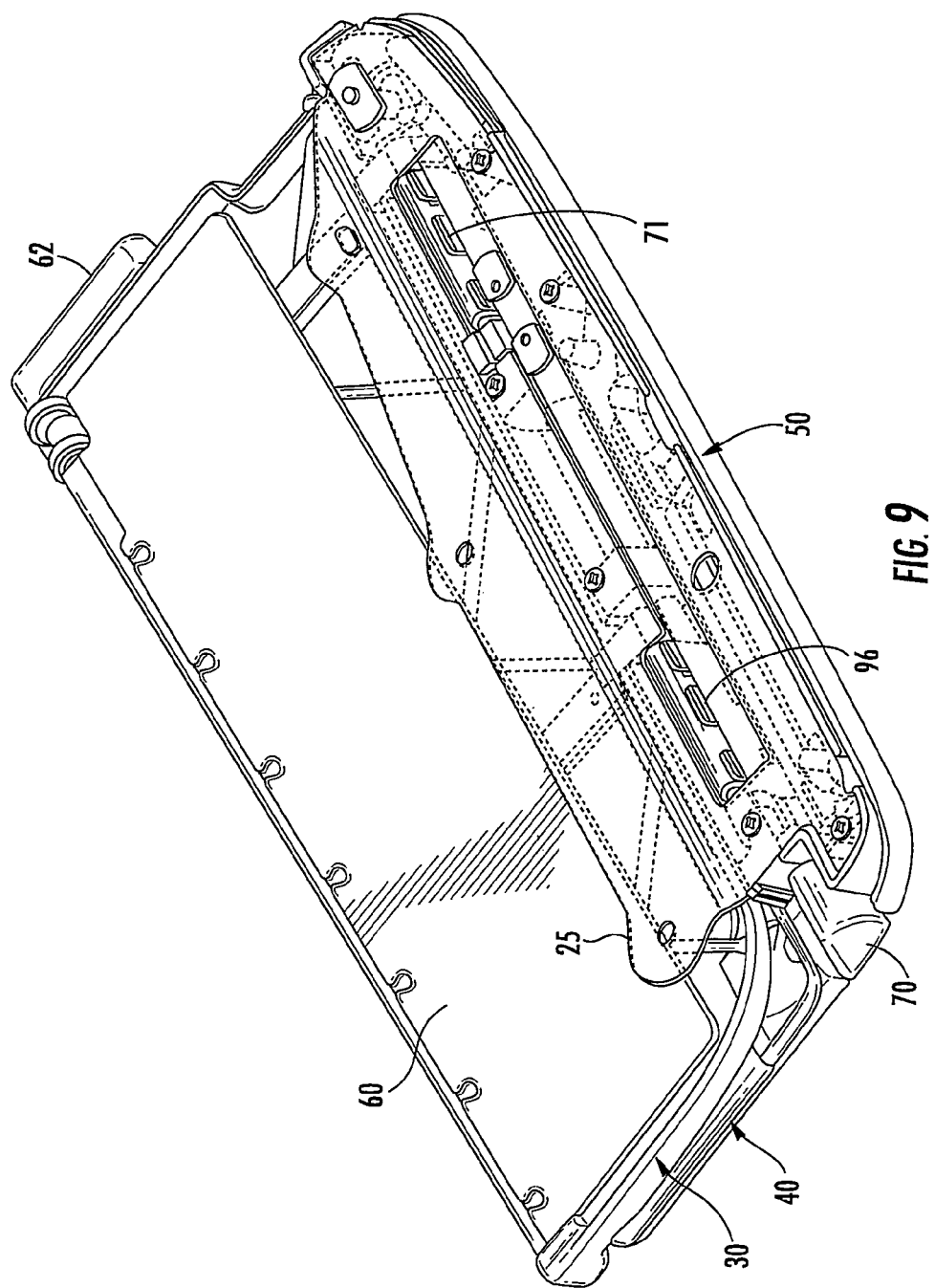
FIG. 9 is a top perspective view of the visor assembly, shown partly in phantom form, as viewed through the roof of a vehicle.
Figure 10:
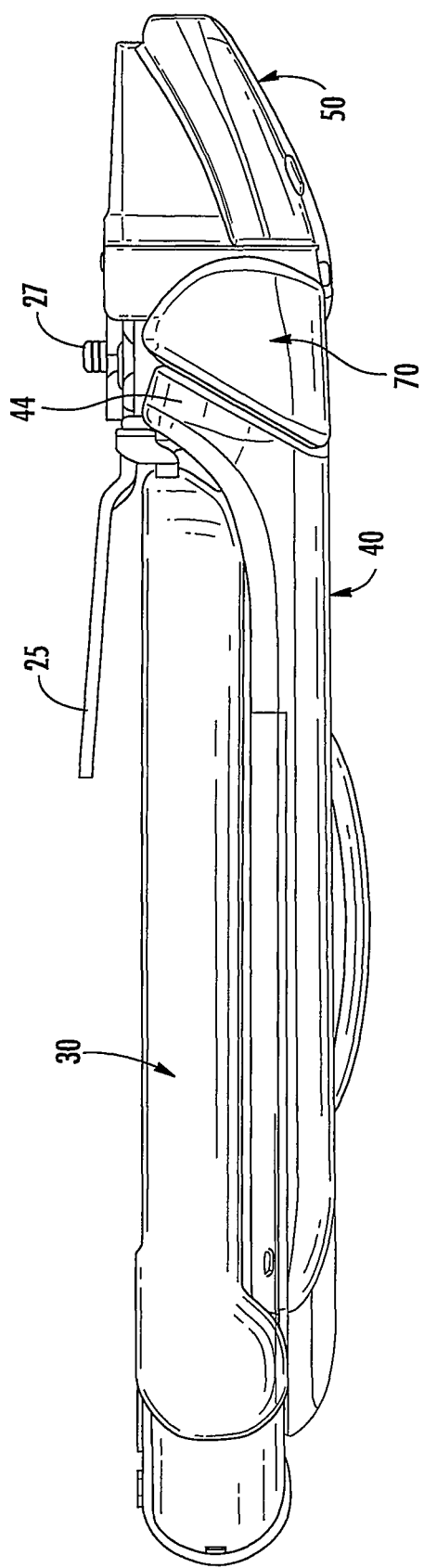
FIG. 10 is a left side elevational view of the visor system.
Figure 11:
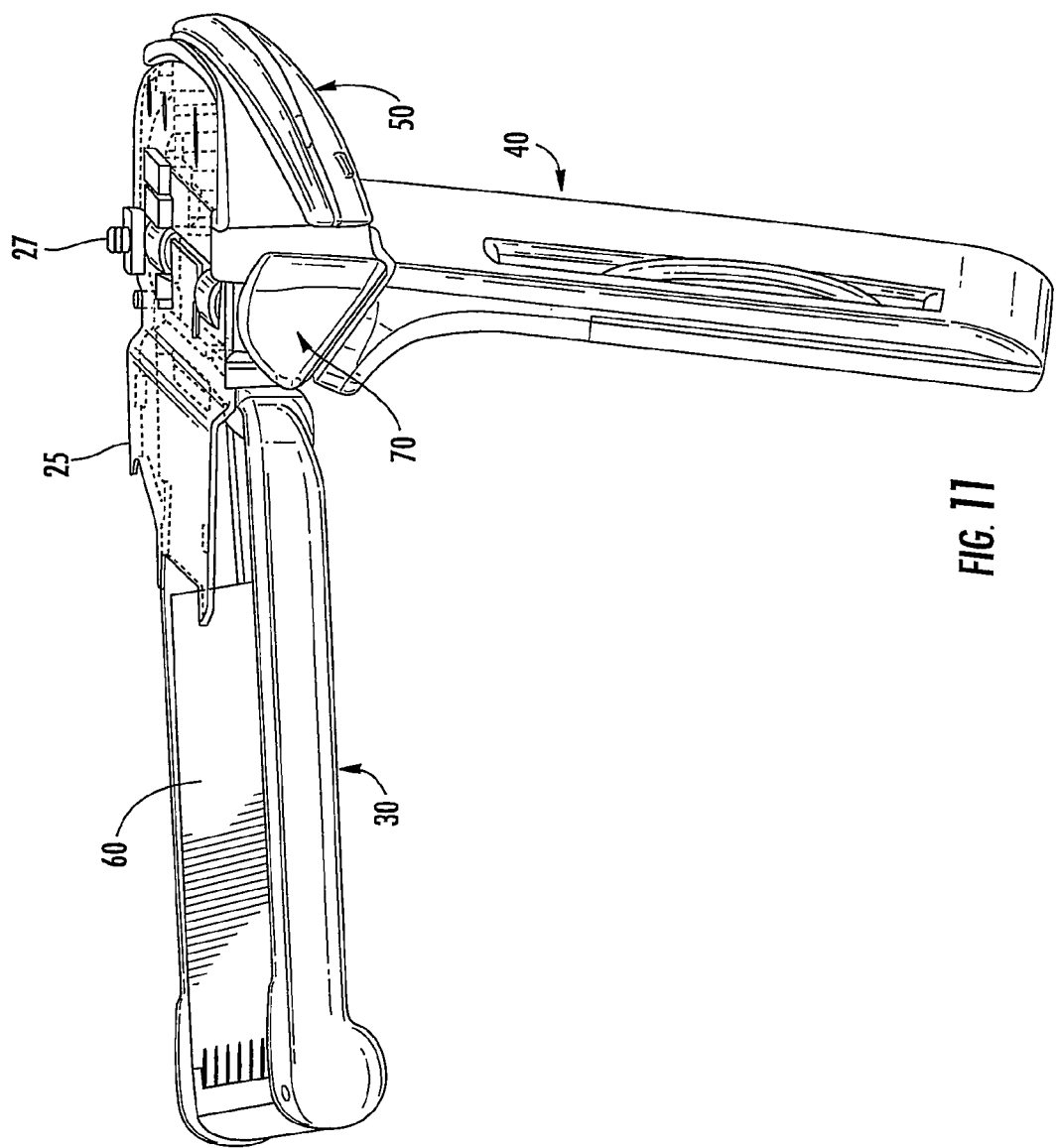
FIG. 11 is a left side elevational view of the visor system shown with the side window visor being moved to a position substantially as shown in FIG. 5.
Figure 13:
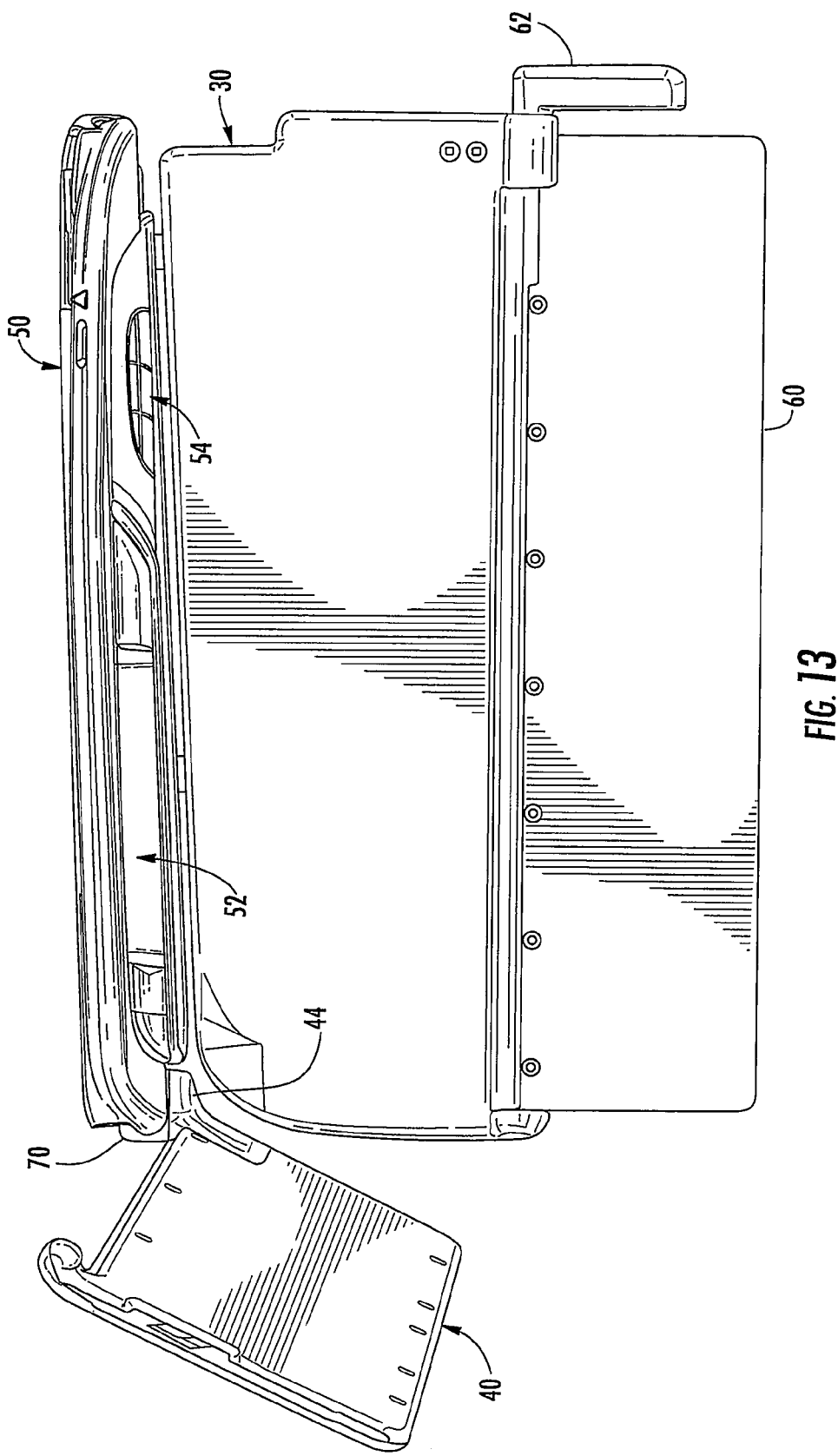
FIG. 13 is a front elevational view of the visor system shown with the primary visor deployed, the glare shield deployed, and the side window visor also deployed to their use positions.
Figure 14:
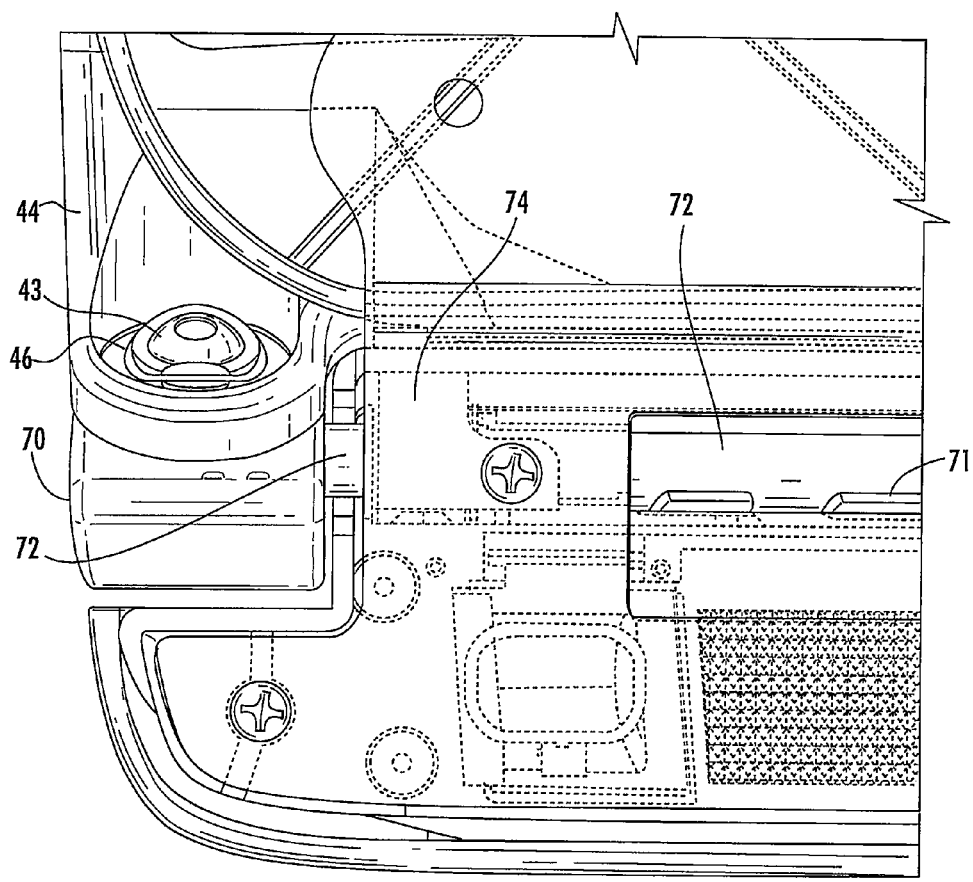
FIG. 14 is an enlarged fragmentary view of the pivot mount of the side window visor to the header.

Referring initially to FIGS. 1-8, there is shown a vehicle 10, such as an automobile, sport utility vehicle (SUV), pickup truck, or the like, which includes a windshield 12, a side window 14, and a roof with a headliner 16. The vehicle also includes an A-pillar 13 located between the windshield 12 and side window 14. A visor assembly 20 embodying the present invention is mounted to the vehicle roof in a pocket formed in headliner 16 adjacent the upper edge 11 of windshield 12. The visor assembly 20 includes three movable sections, including a primary visor 30 (FIG. 4) which remains at the front of the vehicle, a side window visor 40 which dips down and moves to the side window (FIGS. 4-8), and an auxiliary glare shield 60, which is positioned behind the main visor 30 in FIGS. 1-2 but shown in a deployed position in FIGS. 3 and 13. The glare shield 60 is rotatably mounted to the lower edge 31 of the primary visor 30 and is controlled by a handle 62, which rotates the glare shield 60 between a stored position adjacent and coplanar with the primary visor 30 and a deployed position below the primary visor 30, as seen in FIGS. 3 and 13. Both the primary visor 30 and the side window visor 40 are pivotally mounted to a header 50, which is fixedly mounted to the roof of the vehicle by a mounting plate 25 (FIGS. 9-11) using conventional fasteners 27 (FIG. 10). Header 50 is mounted in spaced relationship rearwardly of the upper edge 11 of windshield 12, as seen in FIGS. 1 and 4.

Figure 12:
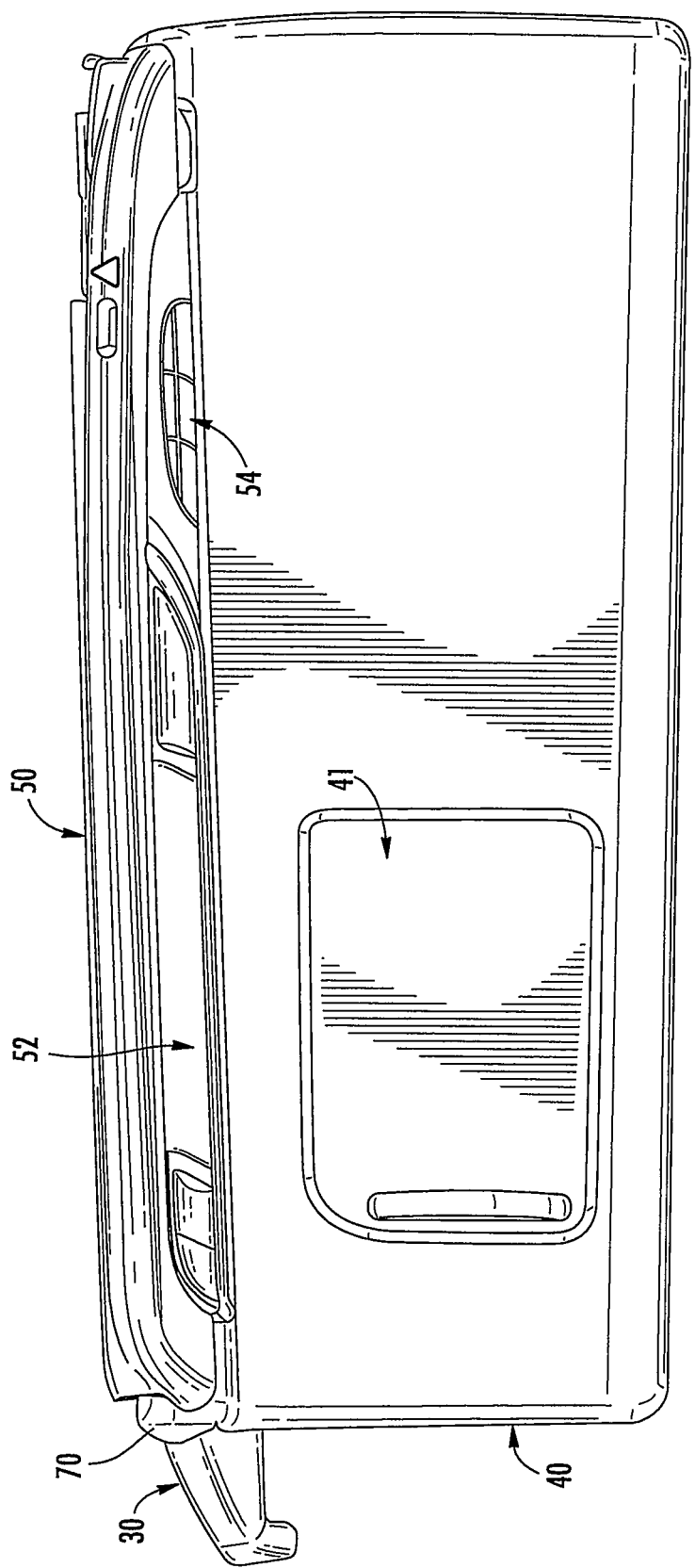
FIG. 12 is a front elevational view of the visor system shown with the side window visor attached to the header and lowered for use of the vanity mirror and for sun blocking.

Visor assembly 20 has several operational positions. FIG. 1 shows visor assembly 20 in a stored position. FIG. 2 illustrates one position in which both the primary visor 30 and coplanar side window visor 40 are lowered together in a direction away from the windshield. The visor assembly 20 can be lowered through a selected arc up to about 40°, depending on how much sun blocking is desired. In another operational position (FIGS. 3 and 13), once the visor assembly 20 is lowered, the glare shield 60 can be rotated downwardly to provide additional sun screening (or blocking) coverage. In FIG. 3, the primary and side window visors 30, 40, respectively, are still nested. In FIG. 13, the side window visor 40 has been rotated to the side window position. As seen in FIG. 12, the side window visor 40 can be independently lowered from the header 50 to provide windshield sun blocking and access to a covered vanity mirror 41.

Header 50 (FIGS. 1-4) includes a source of illumination 52 and a garage door opening transmitter 54 sold under the brand Homelink®. Interior illumination 52 can be actuated either by a map lamp switch 51 or by switch 53 to illuminate a covered vanity mirror 41 in the side window visor 40. The illumination means includes a lens 55 for general illumination and a focusing lens 57 for providing spot illumination when the map lamp switch 51 is actuated. General illumination lens 54 is illuminated when the vehicle doors open to provide general interior lighting.

The primary visor 30 is rotatably mounted to the header 50 by a pivot rod 90 (FIG. 16) which is coupled to visor 30 by a pair of spaced-apart legs 92, such that rotation of the visor 30 rotates pivot rod 90. Rod 90 is rotatably supported in header 50 by a pair of spaced-apart bushings 94. The torque for controlling the motion of visor 30 is controlled by a torque spring 96 mounted to header 50 and having fingers 97 engaging opposite sides of rod 90. Flats 91 on rod 90 engage fingers 97 of torque spring 96 to provide a detented storage position for the visor assembly as seen in FIG. 1. Rod 90 also integrally includes a stop tab 93 which engages a stop 95 on header 50 to limit the lowering rotation of visor assembly 20 and visor 30 to about 40° as it pivots rearwardly away from the windshield to a downward use position, as illustrated in FIGS. 2, 3, and 13. The visor assembly 20 with side window visor 40 nested against the primary visor 30 can be moved from the stowed position shown in FIG. 1 to a first operational position shown in FIG. 2. The pivot mounting of the primary visor 30 to the rearwardly positioned header 50 permits the visor assembly 20 to be moved away from the windshield to the first operational position in which the lower edge 21 of the visor assembly provides sun blocking. Thus, the visor assembly 20 can be tilted progressively from the stowed position shown in FIG. 1 to a lowered position through an arc of about 40° as seen in FIG. 2 to provide sun blocking in the upper area of the windshield traditionally blocked by conventional visors.

In addition, the glare shield 60 can be deployed by rotating handle 62 when the visor assembly 20 is in the position shown in FIG. 2 moving shield 60 to a position shown in FIGS. 3 and 13 to add additional sun-blocking or shielding protection below the lower edge 21 of the visor assembly 20. Shield 60 can be made of a polycarbonate material and pivotally attached to the primary visor 30 in the manner disclosed in U.S. patent application Ser. No. 13/530,226, entitled ROTATABLE GLARE SHIELD FOR A VISOR, filed on Jun. 22, 2012, the disclosure of which is incorporated herein by reference. The glare shield 60 can be made of opaque, micro-louver, transparent, tinted, translucent, polarized, and/or phototropic material to provide supplemental sun-blocking functions for the primary visor 30. Thus, the entire visor assembly 20 can be moved downwardly and rearwardly away from the windshield a selective amount controlled by the torque fitting 96 to provide the desired amount of sun blocking.

Figure 15:
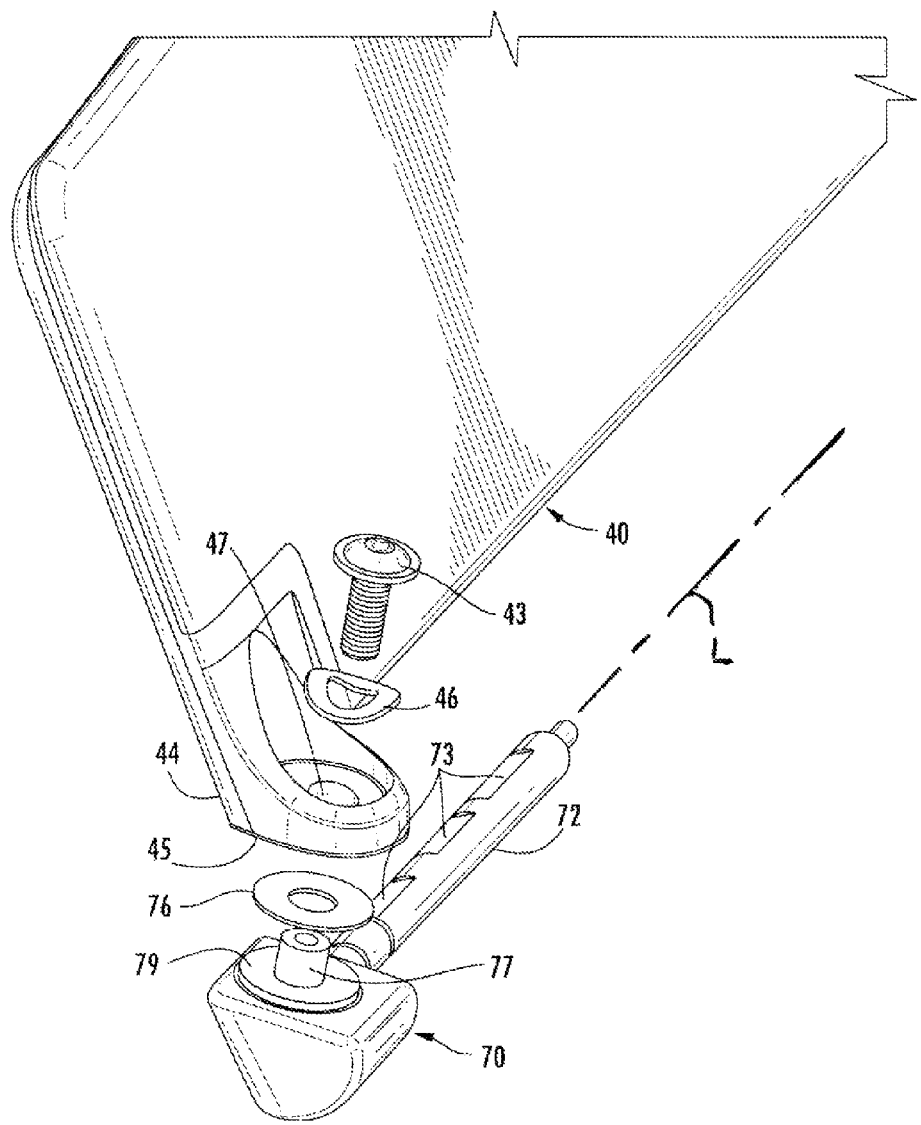
FIG. 15 is an exploded perspective view of the pivot knuckle and side window visor.
Figure 16:
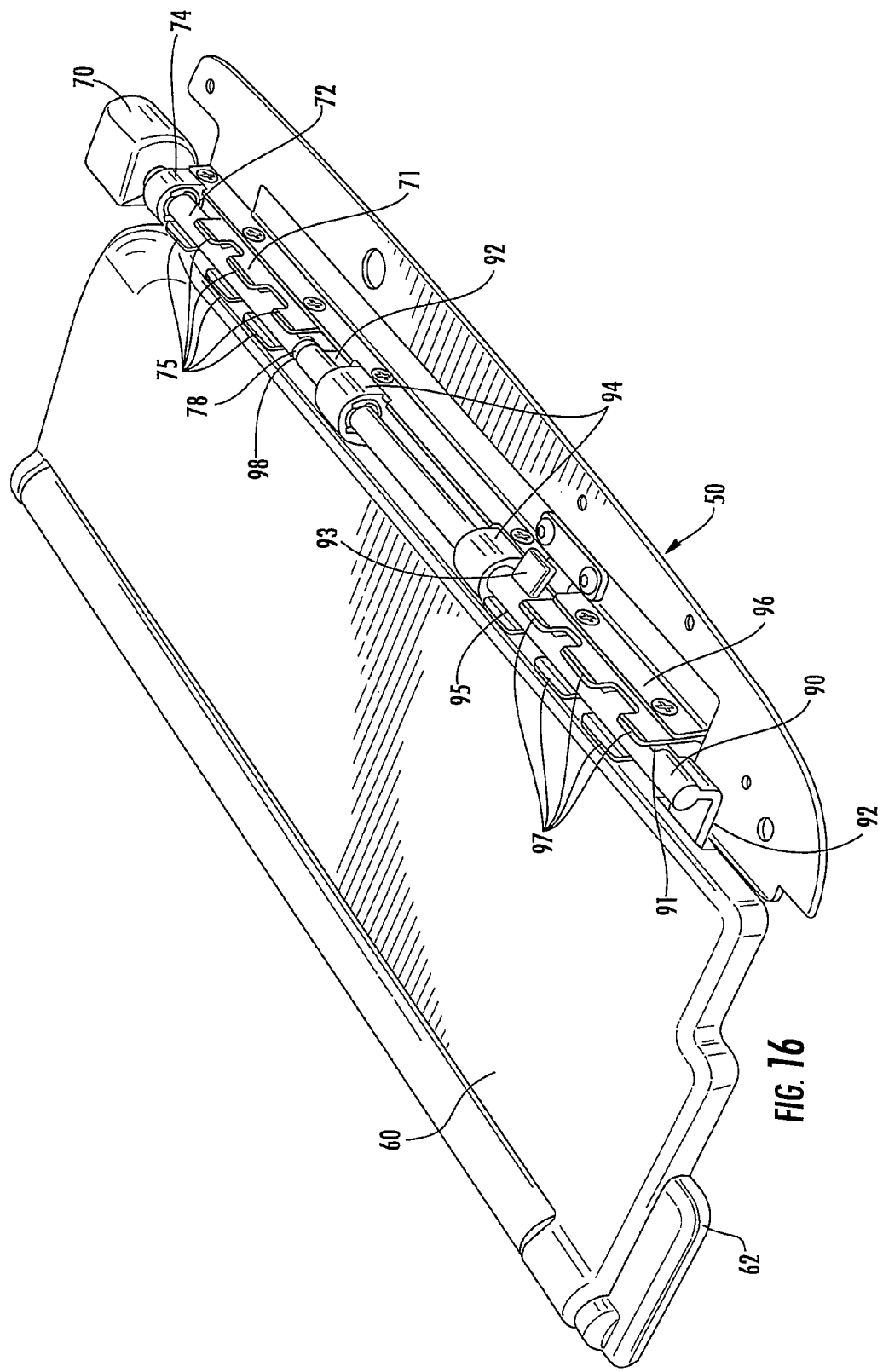
FIG. 16 is a fragmentary perspective view showing the pivot rods for the primary and side window visor and their mounting to the header.

The primary visor 30 is made of a resilient polymeric material, such as ABS, and includes a socket 32 in the upper right corner (FIG. 1), which receives a snap-in rod 42 on the side window visor 40. The side window visor can thus be released from the primary visor as shown in FIGS. 3-7 for movement to the vehicle's side window 14, The side window visor 40 is pivotally coupled to a pivot knuckle 70 (best seen in FIG. 15), which includes a first pivot rod 72 fixedly secured to the knuckle 70. Pivot rod 72 extends into the header 50 and is rotatably mounted therein under the control of a torque spring 71 (FIG. 16). As seen in FIG. 16, pivot rod 72 is coaxial with pivot rod 90 and is supported at the knuckle end by a bushing 74. The rod 72 also has flats 73 (best seen in FIG. 15) which are engaged by the fingers 75 of torque spring 71 secured to header 50. The end 98 of rod 90 and end 78 of rod 72 have a telescopic rotational interrelationship, such that support for the end 78 of rod 72 is provided by the end 98 of rod 90.

Figure 5:
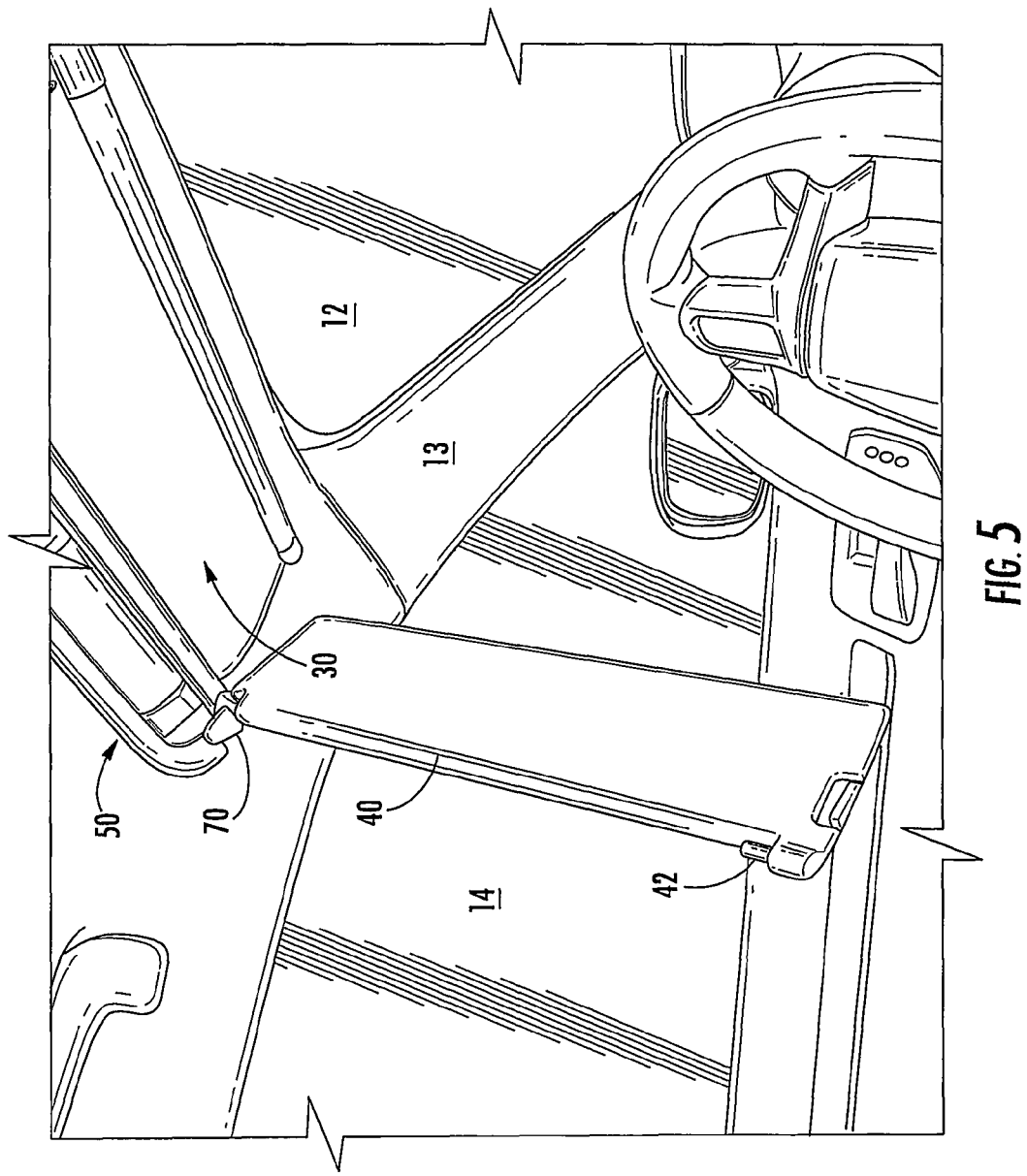
FIG. 5 is a perspective view of the visor system shown in FIGS. 1 and 4, showing the further movement of the side window visor toward the side window position.
Figure 6:
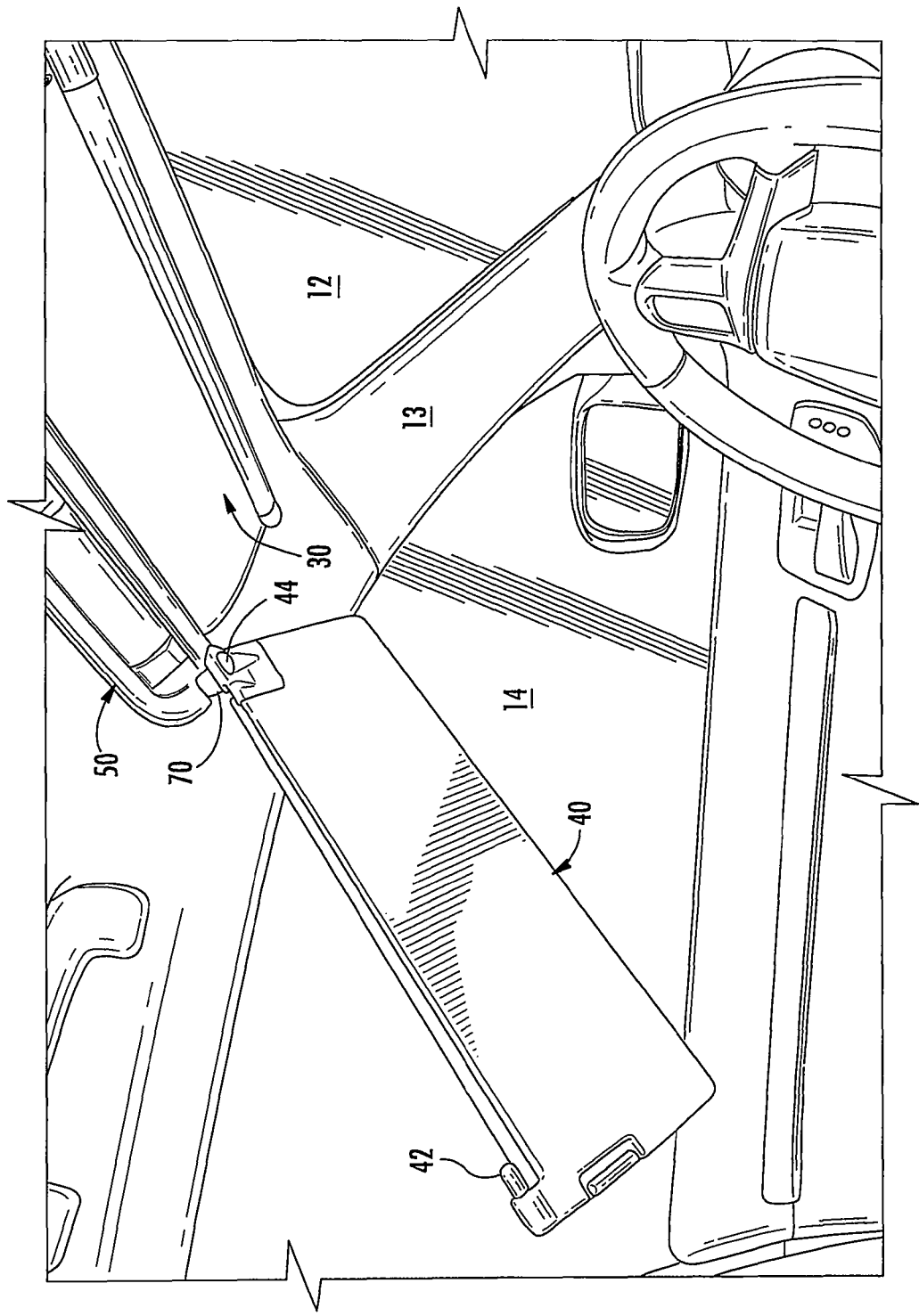
FIG. 6 is a perspective view of the visor system shown in FIGS. 1, 4, and 5, showing the further movement of the side window visor toward the side window position.
Figure 7:
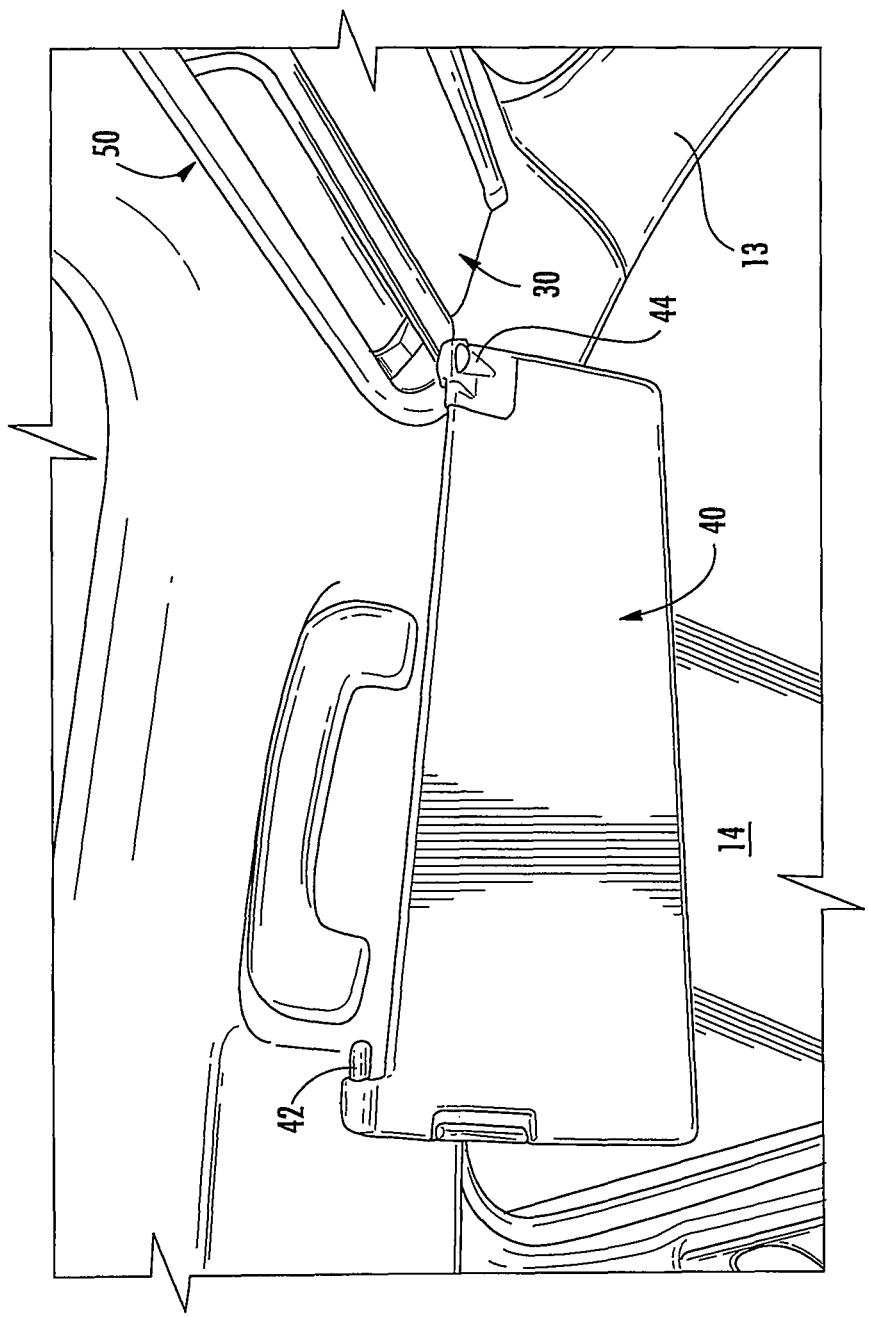
FIG. 7 is a perspective view of the visor system shown in FIGS. 1 and 4-6, shown with the side window visor moved to the side window position.
Figure 8:
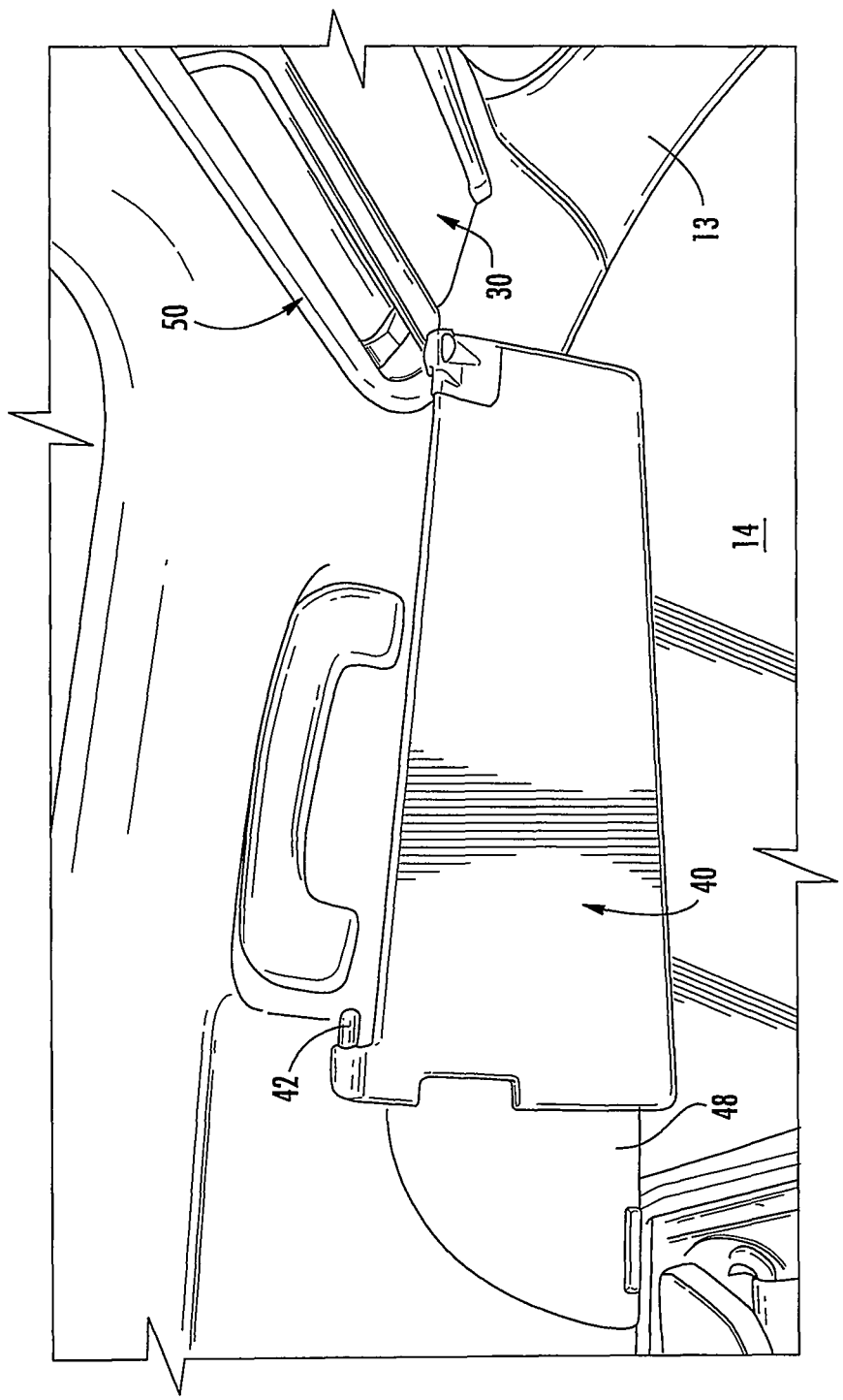
FIG. 8 is a perspective view of the visor system shown in FIG. 7, shown with the side window visor extender moved to an extended position.

The opposite end of side window visor 40 includes an angled bracket 44 (FIG. 15), which is angled to provide a mounting surface 45 which engages angled knuckle surface 79. The knuckle 70 is pivotally coupled to visor 40 by a second pivot connection including a mounting bolt 43 extending through aperture 47 in bracket 44, through a thrust washer 46, a friction washer 76, and is threaded into hollow internally threaded pivot rod 77 defining a second pivot rod for knuckle 70. Pivot rod 77 is orthogonal to the longitudinal axis L (FIG. 15) of pivot rod 72. The rotational interface between visor 40 and knuckle 70 is the aperture 47 in bracket 44 and the outer surface of pivot axle 77. When the pivot knuckle 70 is attached to the header 50, the two axis pivot arrangement allows the side window visor 40 to dip downwardly in the sequence illustrated in Figs, 4-7 as the visor is moved from the stowed position (shown in FIG. 1) to a side window position (shown in FIG. 7). This occurs due to the initial rotation of the knuckle 70 and rod 72 in header 50 as the side window visor 40 is initially released from the primary visor 30. As seen in FIGS. 4 and 5, it dips downwardly out of the head space area of the user. Subsequently, as the user moves the visor toward the side window, the knuckle 70 rotates on pivot rods 72 and 77 to move the visor upwardly and toward the side window position illustrated in FIG. 7. Once in the side window position, an auxiliary extender shield 48 rotatably coupled within the body of side window visor 40 can be deployed, as illustrated in FIG. 8. The mating surfaces 45 of bracket 44 and surface 79 of knuckle 70 incline visor 40 toward the side window 14 at about 20° to keep it away from the side of the driver's face when it is in the detented side window position shown in FIGS. 7 and 8.

Figure 17:
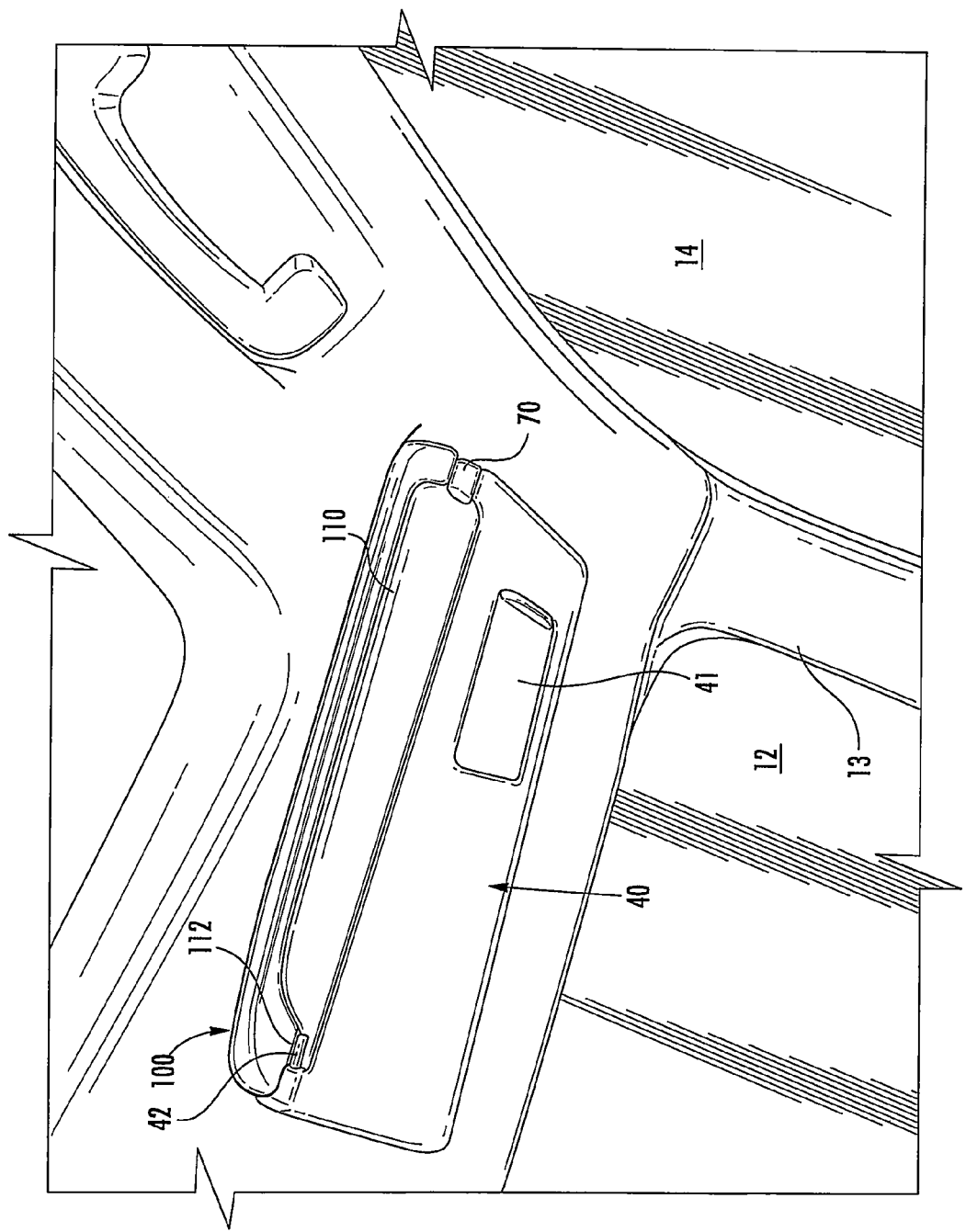
FIG. 17 is a perspective view of the passenger side visor, shown in a stowed position.
Figure 18:
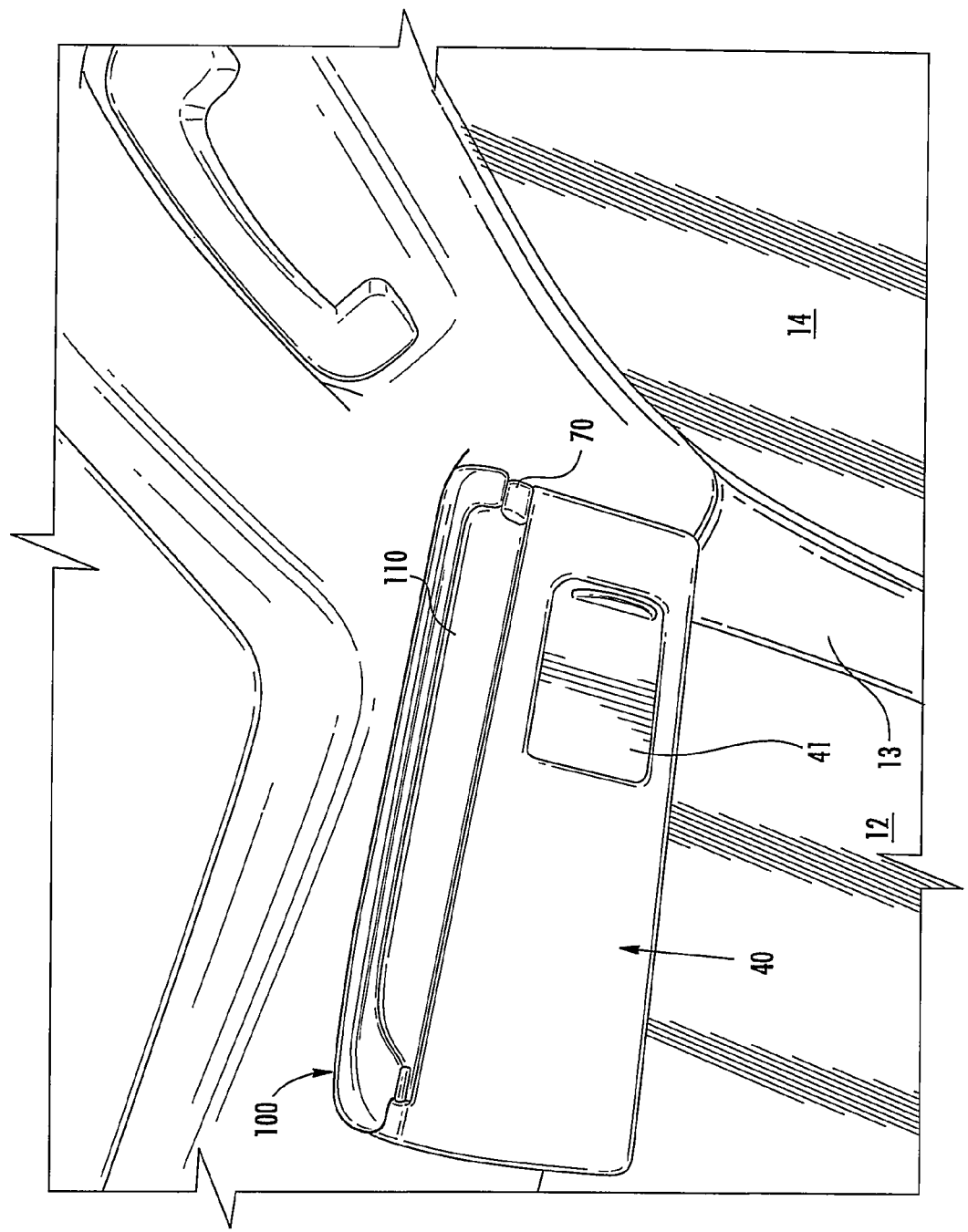
FIG. 18 is a perspective view of a passenger side visor shown in a lowered use position.
Figure 19:
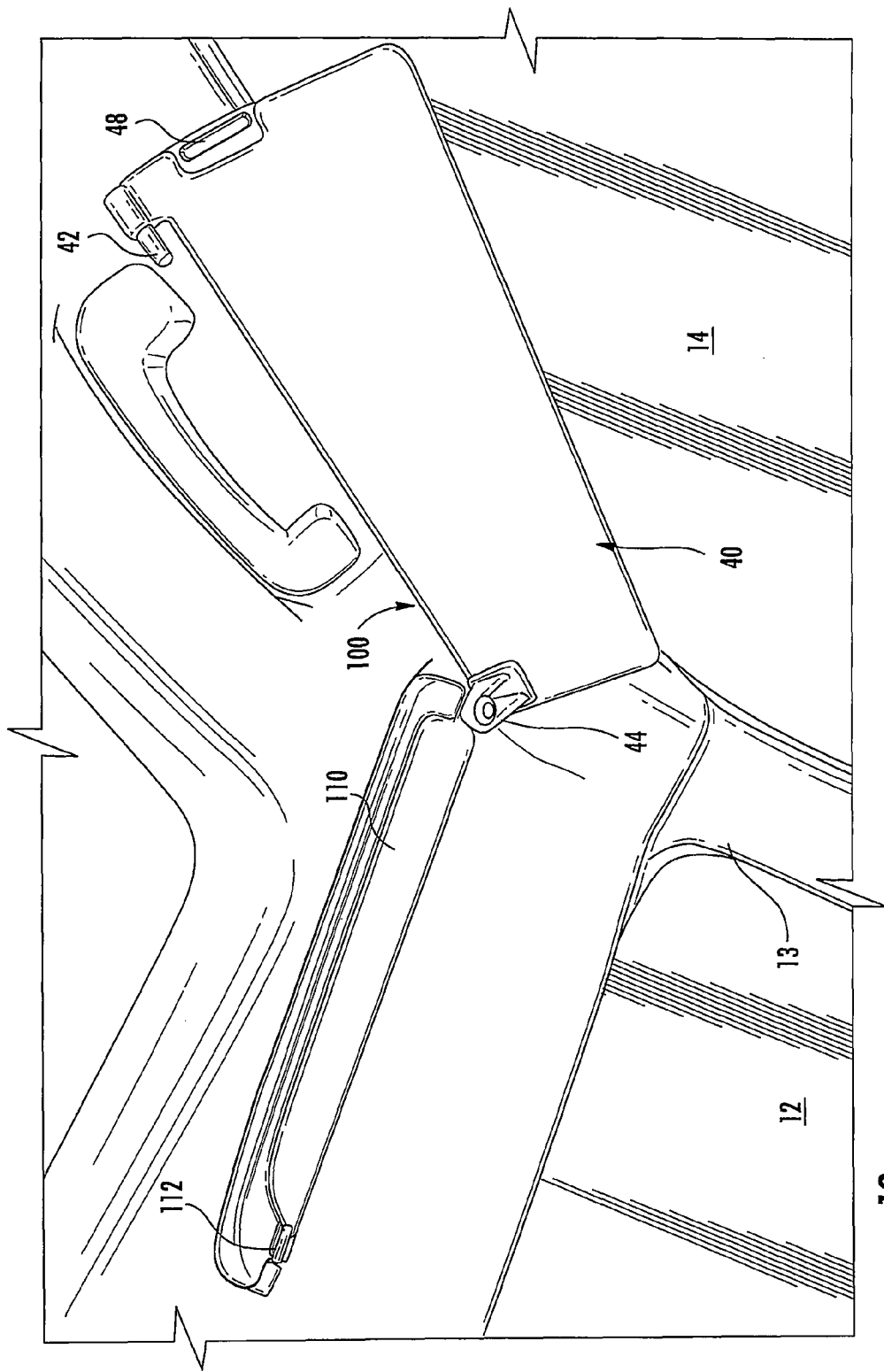
FIG. 19 is a perspective view of the passenger side visor shown in a side window position.

The unique mounting of a dip-down side window visor described in connection with the driver's side visor system of the vehicle can also be employed on the passenger side in an installation illustrated in FIGS. 17-19. In this embodiment, the passenger side visor 100 is provided and includes a header 110, which includes a pivot rod mounting mechanism substantially identical to the mounting of pivot rod 72 of the side window visor 40 on the driver's side. An additional bushing, such as bushing 74, is positioned where the primary visor rod end 98 supported the pivot rod 72 in the prior embodiment. The visor 100 includes the same side window visor construction as in the first embodiment, which includes a pivot connection to a knuckle 70 of the same construction shown in FIG. 15 of the first embodiment. The header 110, however, includes a socket 112 for receiving a snap-fit pin 42 of the visor 40. Visor 40 may also include an illuminated or non-illuminated vanity mirror 41. The visor 40, as shown in FIG. 18, can be pivoted downwardly away from the vehicle windshield to provide sun blocking for the windshield in the same manner as in the first embodiment. It also can be dipped down and around to the side window position, as seen in FIG. 19, in the same downward and side motion as the driver's side visor moves, as illustrated in FIGS. 4-7. Visor 110 has the benefits of the lack of encroachment in the user's space and yet provides both front window and side window protection. In some vehicles, the same visor 100 may be used on both sides of the vehicle where cost is a factor.

It will become apparent to those skilled in the art that various modifications to the preferred embodiment of the invention as described herein can be made without departing from the spirit or scope of the invention as defined by the appended claims.

The invention claimed is:

1. A visor system for a vehicle having a roof and a windshield comprising:
a primary visor;
a mount coupled to said primary visor and attached to the vehicle allowing said visor to rotate from a raised stored position away from the windshield toward the user to lowered use positions;
a side window visor; and
a dual axis pivot knuckle including a first pivot rod to watch said side window visor is rotatably mounted and a second pivot rod orthogonal to said first pivot rod to allow said side window visor to move away from said primary visor on said second pivot rod and dip downwardly, said pivot knuckle allowing said side window visor to then move laterally and upwardly on said first pivot rod to a side window position without encroaching in a user's space.

2. The visor system as defined in claim 1 and further including a detent spring for engaging said first pivot rod for holding said side window visor in predetermined positions.

3. The visor system as defined in claim 2 wherein said predetermined positions include stored against said primary visor and adjacent a side window.

4. The visor system as defined in claim 3 wherein said side window visor includes a rod at an end remote from said knuckle and said primary visor includes a clip for holding said rod of said side window visor for releasably securing said side window visor to said primary visor.

5. The visor system as defined in claim 1 and further including a glare shield which can be extended from said primary visor to provide sun-blocking protection when said primary visor is either in a raised or lowered position.

6. A visor for a vehicle having a roof and a windshield comprising:
a header mounted to the roof of a vehicle in spaced relationship rearwardly of the vehicle's windshield;
the visor for attachment to said header for pivotal movement from a raised stored position rearwardly and downwardly to lowered use positions; and
a dual axis pivotal mount for pivotally mounting said visor to said header for pivoting downwardly, laterally, and then upwardly to a side window position, said dual axis pivotal mount including a pivot knuckle including a first pivot rod to which said side window visor is rotatably mounted and a second pivot rod orthogonal to said first pivot rod to allow said side window visor to move away from said header on said second pivot rod and rotate on said first pivot rod, such that said side window visor dips downwardly and literally and then upwardly to a side window position without encroaching in a user' space.

7. The visor as defined in claim 6 wherein said header includes a detent spring for engaging said pivot rod for holding said visor in predetermined positions.

8. A vehicle having a window shield and a vehicle visor including an auxiliary glare shield, said visor comprising:
a visor body;
a pivot mount for mounting said visor body to a vehicle for movement from a stored position away from the vehicle windshield to lowered use positions;
a side window visor including a dual axis pivotal mount coupled to said vehicle for pivotally mounting said side window visor to a vehicle for dipping downwardly and laterally to a side window position without encroaching in a user's space; and
the auxiliary glare shield pivotally mounted to said visor body on a side of said visor body, such that it can be rotated downwardly in a vertical plane from a stored position adjacent and substantially coplanar with said visor body to a use position extending away from said visor body for providing supplemental sun screening.

9. The visor as defined in claim 8 wherein said auxiliary glare shield is mounted to said visor body facing the vehicle windshield.

10. The visor as defined in claim 9 wherein said glare shield includes at least one axle rotatably mounted to said visor body such that said glare shield can be pivoted to selected use positions.

11. A vehicle visor including an auxiliary glare shield comprising:
   a visor body;
   a pivot mount for mounting said visor body to a vehicle for movement from a stored position away from a vehicle windshield to lowered use positions;
   a side window visor including a dual axis pivotal mount coupled to said vehicle for pivotally mounting said side window visor to a vehicle for pivoting downwardly and laterally to a side window position without encroaching in a user's space; and
   the auxiliary glare shield pivotally mounted to said visor body on a side of said visor body, such that it can be rotated from a stored position adjacent and substantially coplanar with said visor body to a use position extending away from said visor body for providing supplement sun screening, wherein said auxiliary glare shield is mounted to said visor body facing the vehicle windshield and includes at least one axle rotatably mounted to said visor body such that said glare shield can be pivoted to selected use positions, and wherein said auxiliary glare shield is a panel and a lever is mounted to an edge of the visor body and coupled to said axle for rotating said auxiliary glare shield between stored and use positions.

12. The visor as defined in claim 11 wherein said auxiliary glare shield comprises a panel chosen from the group consisting of an opaque, micro-louver, transparent, tinted, translucent, polarized, and phototropic material.

13. The visor as defined in claim 12 wherein said dual axis mount includes a pivot knuckle having a pivot rod extending from said pivot knuckle into said pivot mount and wherein said side window visor is pivotally coupled to said pivot knuckle.

14. The visor as defined in claim 13 wherein said pivot rod has a longitudinal axis and the axis of rotation of said side window visor with respect to said pivot knuckle is substantially orthogonal to the longitudinal axis of the pivot rod.

15. A vehicle visor comprising:
   a visor body;
   a pivot mount for mounting said visor body to a vehicle for movement from a stored position to lowered use positions; and
   an auxiliary glare shield rotatably mounted with respect to said visor body, such that said auxiliary glare shield can be rotated from a stored position adjacent and substantially coplanar with said visor body to a use position extending away from said visor body for providing supplement sun screening, wherein said auxiliary glare shield is a panel and a control is mounted to an edge of the visor body and coupled to said auxiliary glare shield for rotating said auxiliary glare shield between stored and use positions.

16. The visor as defined in claim 15 wherein said auxiliary glare shield is mounted to said visor body facing a vehicle windshield and includes at least one axle rotatably mounted to said visor body such that said glare shield can be rotated to selected use positions.

17. The visor as defined in claim 16 wherein said auxiliary glare shield comprises a panel chosen from the group consisting of an opaque, micro-louver, transparent, tinted, translucent, polarized, and phototropic material.

18. A vehicle visor comprising:
   a visor body;
   a pivot mount for mounting said visor body to a vehicle for movement from a stored position to lowered use positions; and
   an auxiliary glare shield rotatably mounted with respect to said visor body, such that said auxiliary glare shield can be rotated from a stored position adjacent and substantially coplanar with said visor body downwardly in a vertical plane from the stored position to a use position extending away from said visor body for providing supplemental sun screening, wherein said auxiliary glare shield is a panel and a control handle is located adjacent the visor body and coupled to said auxiliary glare shield for rotating said auxiliary glare shield between stored and use positions.

19. The visor as defined in claim 18 wherein said auxiliary glare shield is mounted to said visor body facing a vehicle windshield and includes at least one generally horizontally extending axle rotatably mounted to said visor body such that said auxiliary glare shield can be rotated in said vertical plane to selected use positions.

20. The visor as defined in claim 19 wherein the material of said panel of said auxiliary glare shield is chosen from the group consisting of an opaque, micro-louver, transparent, tinted, translucent, polarized, and phototropic material.

* * * * *

UNITED STATES PATENT AND TRADEMARK OFFICE
CERTIFICATE OF CORRECTION

PATENT NO.         : 8,925,995 B2
APPLICATION NO.    : 13/633309
DATED              : January 6, 2015
INVENTOR(S)        : Marcus et al.

Page 1 of 1

It is certified that error appears in the above-identified patent and that said Letters Patent is hereby corrected as shown below:

In the Claims

Column 6, line 1, "watch" should be --which--;

Column 6, line 43, "literally" should be --laterally--;

Column 6, line 46, after "said" insert --first--;

Column 6, line 48, "window shield" should be --windshield--;

Column 7, line 20, "supplement" should be --supplemental--; and

Column 8, line 6, "supplement" should be --supplemental--.

Signed and Sealed this
Second Day of June, 2015

Michelle K. Lee
*Director of the United States Patent and Trademark Office*